(12) United States Patent
Lipson et al.

(10) Patent No.: US 11,835,803 B2
(45) Date of Patent: Dec. 5, 2023

(54) CONTROLLING EVANESCENT WAVES ON DIELECTRIC WAVEGUIDES

(71) Applicant: The Trustees of Columbia University in the City of New York, New York, NY (US)

(72) Inventors: Michal Lipson, New York, NY (US); Janderson Rocha Rodrigues, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 163 days.

(21) Appl. No.: 17/119,328

(22) Filed: Dec. 11, 2020

(65) Prior Publication Data

US 2021/0181548 A1    Jun. 17, 2021

Related U.S. Application Data (60) Provisional application No. 62/946,840, filed on Dec. 11, 2019.

(51) Int. Cl.
    *G02F 1/035*    (2006.01)
(52) U.S. Cl.
    CPC .................................. *G02F 1/035* (2013.01)
(58) Field of Classification Search
    CPC ....................................................... G02F 1/035
    See application file for complete search history.

(56) References Cited

U.S. PATENT DOCUMENTS

| | | |
|---|---|---|
| 9,897,754 B2 | 2/2018 | Zhou et al. |
| 11,551,921 B1 * | 1/2023 | McGuinness ......... B81B 7/0035 |
| 2007/0197888 A1 | 8/2007 | Axelrod et al. |
| 2019/0011714 A1 | 1/2019 | Hendrix et al. |

FOREIGN PATENT DOCUMENTS

| | | |
|---|---|---|
| WO | 2019/095414 A1 | 5/2019 |
| WO | 2019/199985 A1 | 10/2019 |

OTHER PUBLICATIONS

Almeida, V.R. et al., "Guiding and confining light in void nanostructure," Optics Letter, vol. 29, Issue 11, Jun. 1, 2004, pp. 1209-1211.
Datta et al., "Enhanced sensitivity of fiber optic evanescent wave absorption-based concentration sensor by shining a Bessel-Gauss beam and effect of fiber bending on the sensor response: a theoretical analysis," Optical Engineering, May 2019; 58(5):056112.

(Continued)

*Primary Examiner* — John Bedtelyon
(74) *Attorney, Agent, or Firm* — BakerHostetler (57) ABSTRACT

Methods, devices and systems for communication are disclosed. An example device can comprise a first waveguide portion disposed on a substrate, a second waveguide portion, and a third waveguide portion disposed between the first waveguide portion and the second waveguide portion. The third waveguide portion can be configured to carry a signal based on a refractive index of the third waveguide portion matching an effective refractive index of an optical mode of a combination of the first waveguide portion and the second waveguide portion.

21 Claims, 8 Drawing Sheets
(6 of 8 Drawing Sheet(s) Filed in Color)

(56) References Cited

OTHER PUBLICATIONS

Dwivedi, S., "Measurements of Effective Refractive Index of SOI Waveguides using Interferometers," Advanced Photonics, OSA Technical Digest (online) (Optical Society of America, 2015), paper IM2A.6, Jul. 2015, pp. 3.

Jahani et al., "Controlling evanescent waves using silicon photonic all-dielectric metamaterials for dense integration," Nat. Commun., May 2018; 9(1):1893.

Meng et al., "Low-loss metal-dielectric waveguide mode enabled structured illumination microscopy with 0.18(Lamda) 0 resolution," Optics Exoress, Mar. 2019; 27(6):9250-9257.

Miri, M-A. et al., "Exceptional points in optics and photonics," Science, vol. 363, No. 42, Jan. 4, 2019, eaar7709, pp. 13.

Norrman et al., "Polarimetric nonregularily of evanescent waves," Optics Letters, Jan. 2019; 44(2):215-218.

Reece et al., "Near-field optical micromanipulation with cavity enhanced evanescent waves," Applied Physics Letters, Jun. 2006; 88(22):221116.

Samavati et al., "Comprehensive investigation of evanescent wave optical fiber refractive index sensor coated with ZnO nanoparticles," Optical Fiber Technoloy, Nov. 2019, 52:101976.

Soref, "The past, present, and future of silicon photonics," IEEE, 2006; 12(1):1678-87.

\* cited by examiner

CONTROLLING EVANESCENT WAVES ON DIELECTRIC WAVEGUIDES

CROSS-REFERENCE TO RELATED APPLICATIONS

This application claims priority to and is a non-provisional of U.S. Provisional Application No. 62/946,840 filed Dec. 11, 2019, which is hereby incorporated by reference for any and all purposes.

BACKGROUND

Existing dielectric waveguides are often constructed of a high-index material (e.g., a high-index material surrounded by a lower-index material) and are characterized by total internal reflection. This in turn limits the performance of such waveguides and also limits the material that can be used in waveguides. Accordingly, there is a long-felt need for improved waveguide configurations.

SUMMARY

In meeting the described long-felt needs, the present disclosure provides methods and devices for communication. An example device can comprise a first waveguide portion disposed on a substrate, a second waveguide portion, and a third waveguide portion disposed between the first waveguide portion and the second waveguide portion. The third waveguide portion can be configured to carry a signal based on a refractive index of the third waveguide portion matching an effective refractive index of an optical mode of a combination of the first waveguide portion and the second waveguide portion.

An example method can comprise forming a first waveguide portion on a substrate, forming a second waveguide portion, and forming a third waveguide portion between the first waveguide portion and the second waveguide portion. The third waveguide portion can be configured to carry a signal based on a refractive index of the third waveguide portion matching an effective refractive index of an optical mode of a combination of the first waveguide portion and the second waveguide portion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B may include parts in addition to Part A and Part B, but may also be formed only from Part A and Part B.

Optical modes in dielectric waveguides follow specific spatial-distribution profiles dictated by the solutions of Maxwell's equations with their respective boundary conditions at the materials interfaces. For a common time-harmonic excitation, the guided solutions have their spatial profile (e.g., a Gaussian-like profile) formed by a combination of exponential and complex exponential functions that are almost transverse to the propagation direction, where the waveguide core (the material with highest refractive index) has the maximum field intensity whereas the claddings (the materials with lower refractive index) have exponential amplitude decays, which called evanescent field or waves. These evanescent fields have implications in science and technology, due to the physical phenomena related to them, with applications in optical sensing, directional couplers, light modulation, nonlinear-enhanced interactions, dispersion engineering, near-field based devices, etc. In this context, methods and devices that provide efficient control of these evanescent waves of optical guided modes are useful.

The control of the evanescent fields of the optical modes is achieved by adjusting the refractive indexes of the cladding media. Waveguide structures and methods to achieve such control are provided, which are capable of maintaining a constant amplitude or a linear variation of the field distribution through the entire cladding material instead of the usual exponential decay behavior. Furthermore, the same structures and methods can be applied to guide and confining light in such a way that the maximum field intensity is localized in the low-refractive-index material (cladding) instead of in the conventional high-refractive-index material (core).

Non-evanescent behaviors of the field amplitude inside low-index materials are archived here by matching the effective refractive index of a given optical mode to the refractive index of the desired material layer. Although this seems a very simple task, it is nontrivial because the introduction of a new layer in a waveguide structure will change the effective refractive index of the optical mode, i.e., $n_{eff}(n(x'))$, making it apparently impossible to get a non-evanescent behavior. To overcome this challenge, provided is a method based on the auto-consistency and degeneracy properties of Maxwell's equations and geometric symmetries in our waveguide structures.

The structures provide the control of the evanescent field distributions (internal or external) in the low-refractive-index materials by relying on the auto-consistency and degeneracy properties of Maxwell's equations. The Maxwell (or the Helmholtz) wave equation in a 1D-system, for the Transverse Electric (TE) polarization ($E_z$=0), is given by:

$$\frac{\partial^2 E_y(x)}{\partial x^2} \frac{1}{k_0^2} + (n^2(x) - n_{eff}^2)E_y(x) = 0 \qquad (1)$$

where $n_{eff}$ is the effective refractive index of the optical mode. The effective refractive index is a numerical value that represents the guided optical mode for a given geometry at a given light wavelength (frequency). Equation (1) can be solved by considering a piece-wise continuous refractive index profile and connected by the dielectric boundary conditions.

The disclosed method includes the following steps. First, one can obtain analytically or numerically the optical mode effective refractive index ($n_{eff}$) and its fields spatial-profile distributions ($E_y(x)$) for a given waveguide geometry at a given wavelength. Second, one can introduce a new low-index material layer, with a refractive index of $n_1$, in the mentioned waveguide geometry, where the value of the new material layer refractive index matches the effective refractive index of the optical mode obtained without the new layers, i.e., $n_1 = n_{eff}$. This process reduces the 1D Helmholtz wave equation (Eq. (1)) on this new material layer to $$\partial^2 E_y(x)/\partial x^2 = 0,$$

which has the following linear solution: $E_y(x) = Ax + B$, where A is the slope given by $$A = dE_y(x')/dx,$$

where x' is the position of the new layer, and B is the intercept that can be obtained by applying the appropriate boundary conditions. Moreover, the wave equation solutions outside the new material layer stay the same as they were before the introduction of this new material layer.

Therefore, by introducing the matching layer in a given spatial region, x', where the amplitude of electric field spatial distribution is the maximum, $E_y(x')=|E_0|$, results in a null slope, A=0, and an intercept of $B=|E_0|$, which ensures that the field remains constant through the entire matching layer, $E_y(x)=B=|E_0|$, and it does not depend on the size of the matching layer (the layer width, in this 1D case). On the other hand, by inserting this matching layer in any other point different from the maximum field amplitude ($E_y(x')\neq|E_0|$) will create a linear distribution, where its slope can be designed by choosing the appropriate position of the index-matching layer (x'), i.e., $$E_y(x') = dE_y(x')/dx \cdot x + E_0.$$

Another consideration is that for the constant electric field solution $E_y$ ($E_y(x')=|E_0|$), then the transverse component of the magnetic field $H_x$ is also constant ($H_x(x')=n_{eff}/c\mu_0 E_0=|H_0|$), whereas the longitudinal component of the magnetic field $H_z$, it is null inside the matching layer, since it is a function of the derivate of the electric field, ($H_z(x')=j n_{eff}/c\mu_0 \, dE_0/dx=0$). Therefore, because the group refractive index (the group velocity) is related to the longitudinal component of the field (the magnetic field $H_z$, in this 1D TE case), which in this case is null, then the matching layer does not change the waveguide dispersion at this wavelength. Therefore, it can be used for dispersion engineering.

Further, by making the refractive index of the low-index material layer at the position x' be higher than the effective refractive index of the desired optical mode, i.e., $n_1 > n_{eff}$, but lower than the core refractive index, results in a solution of the kind $E_y(x) \propto \cos(\kappa x)$, inside the new layer, which also ensures that the highest field amplitude is localized at the low-refractive-index material.

Even though the results discussed previously were based on a 1D simplified model, the physical effects and methods described can be generalized for 2D and 3D structures. This can be applied to the fundamental mode of a circular waveguide as an optical fiber, for example.

Figure 1:
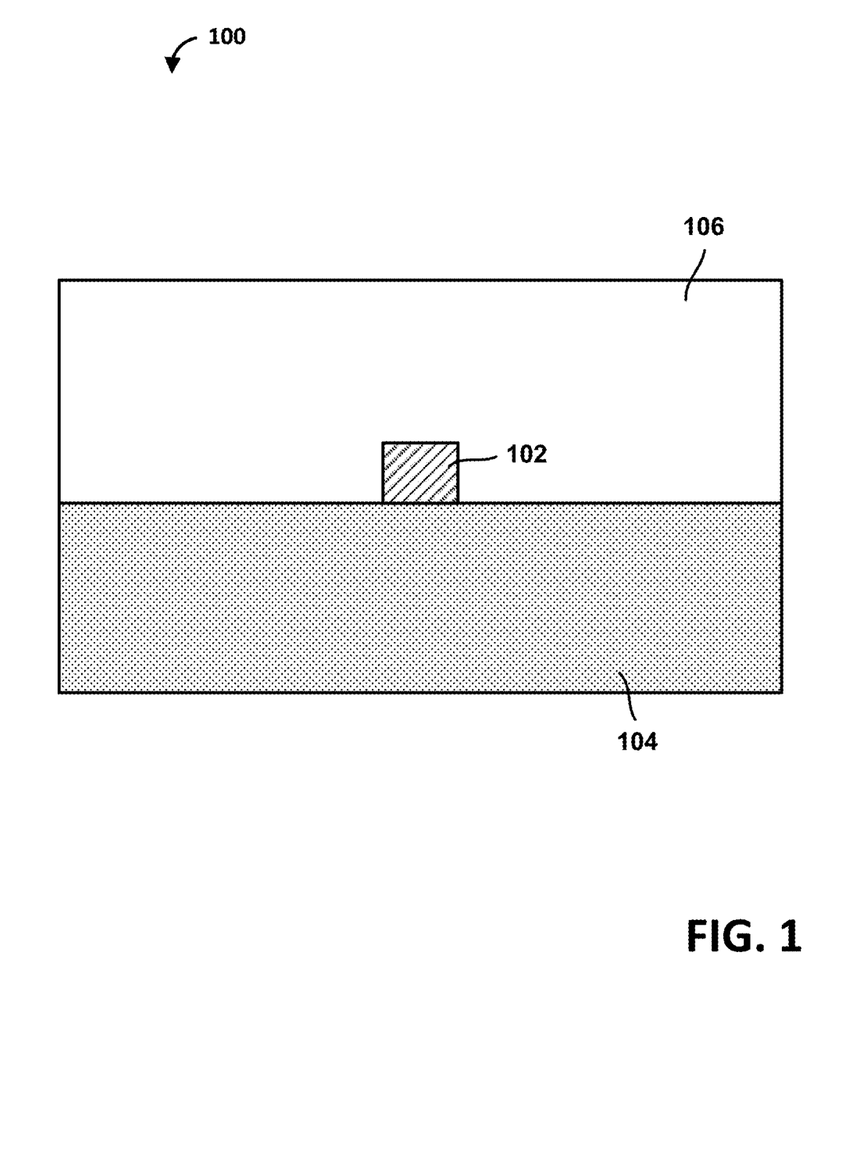
FIG. 1 provides an exemplary waveguide.
Figure 2:
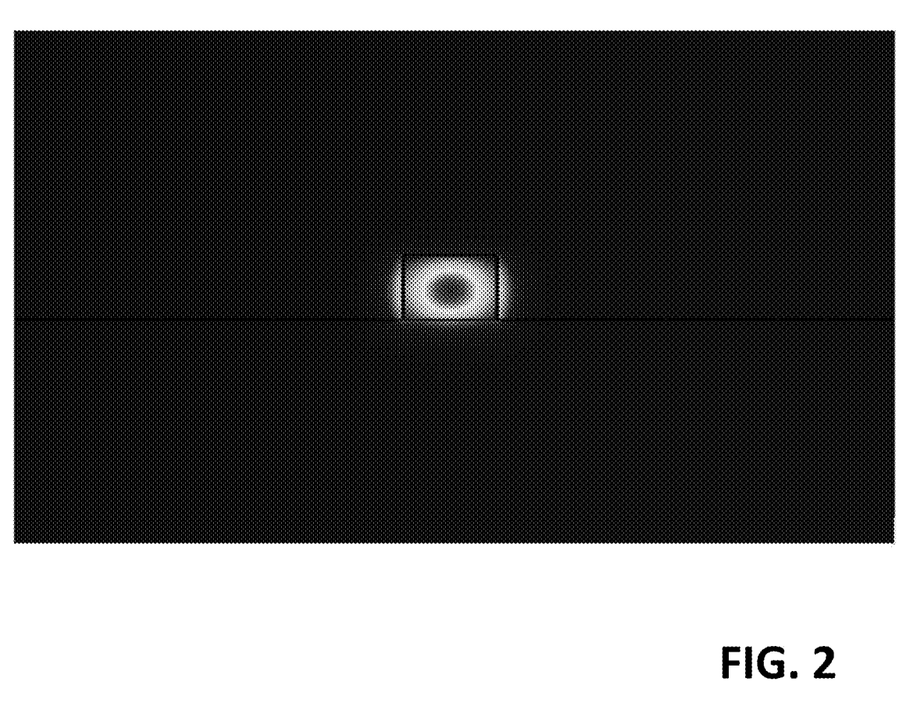
FIG. 2 provides an exemplary simulation of the silicon nitride waveguide over silicon oxide substrate covered by air.

FIG. 1 is a diagram of an example structure 100. A cross-sectional view of the structure is shown. The structure 100 may comprise a waveguide 102. The waveguide 102 may be disposed on a substrate 104. An additional material 106 may be disposed above the waveguide 102, the substrate 104, or a combination thereof. The waveguide 102 may be rectangular. FIG. 2 is a diagram showing a simulation of an electric field spatial distribution for the fundamental optical mode of the waveguide 102.

In an example implementation, the waveguide structure is composed of a silicon nitride ($Si_3N_4$) rectangular waveguide (e.g., with a width of 750 nm and a thickness of 730 nm) over a silicon oxide substrate ($SiO_2$) and covered by air (uncladded). The result of the simulation of the electric field spatial distribution for the fundamental quasi-TE optical mode, at the wavelength of 1550 nm, is shown in FIG. 2.

Figure 3A:
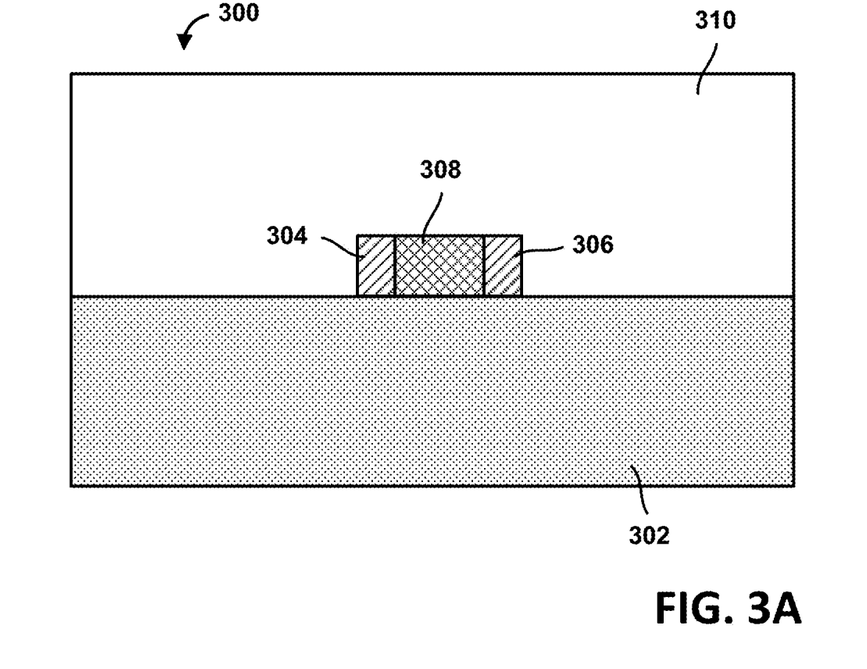
FIG. 3A provides an exemplary waveguide in accordance with the present disclosure.
Figure 3B:
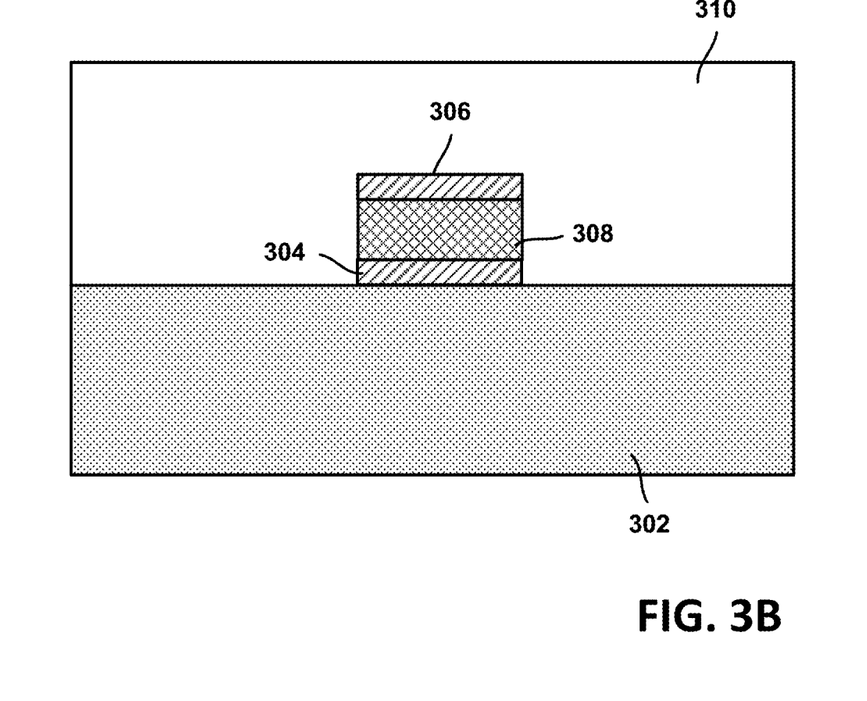
FIG. 3B provides another exemplary waveguide in accordance with the present disclosure.

FIGS. 3A-B are diagrams of an example structure 300 (e.g., or device) in accordance with the present disclosure. The structure 300 may comprise a substrate 302. The structure 300 may comprise a first waveguide portion 304. The first waveguide portion 304 may be disposed on the substrate 302. The structure 300 may comprise a second waveguide portion 306. The second waveguide portion 306 may be disposed on the substrate 302. The structure 300 may comprise a third waveguide portion 308. The third waveguide portion 308 may be disposed between the first waveguide portion 304 and the second waveguide portion 306.

As shown in FIG. 3A, the second waveguide portion 306 may be formed and/or disposed on the substrate 302. The third waveguide portion 308 may be formed and/or disposed on the substrate 302. As shown in FIG. 3B, the third waveguide portion 308 may be disposed above the first waveguide portion 304. The second waveguide portion 306 may be disposed above the third waveguide portion 308. In some scenarios, one or more intervening layers may be disposed between the third waveguide portion 308 and one or more of the first waveguide portion and the second waveguide portion 306.

The third waveguide portion 308 may be configured to carry a signal based on a refractive index of the third waveguide portion 308 matching an effective refractive index of an optical mode of a combination of the first waveguide portion 304 and the second waveguide portion 306. The effective refractive index of the optical mode may be based on a geometry of the combination of the first waveguide portion 304 and the second waveguide portion 306, a wavelength associated with the optical mode, and/or a dielectric material of the combination of the first waveguide portion and the second waveguide portion. The optical mode of the combination of the first waveguide portion 304 and the second waveguide portion 306 may comprise an optical mode of a resulting waveguide if the distance between the second waveguide portion 306 and the first waveguide portion 304 was reduced to zero. The refractive index matching the effective refractive index may comprise the refractive index matching, within a threshold range (e.g., according to manufacturing tolerances), the effective refractive index. As an example, the combination of the first waveguide portion 304 and the second waveguide portion 306 may comprise the waveguide 102 of FIG. 1. As another example, matching may be based on the first waveguide portion 304 being a first half of the waveguide 102 (e.g., or other waveguide) and the second waveguide portion 306 being a second half of the waveguide 102.

The optical mode may be translationally invariant. For example, the optical mode may persist regardless of the distance between the first waveguide portion 304 and the second waveguide portion 306 (e.g., regardless of the thickness or width of the third waveguide portion 308). The third waveguide portion 308 may separate the first waveguide portion 304 and the second waveguide portion 306 by a distance in a range of one or more of about 200 nm to about 1 μm, about 200 nm to about 10 μm, about 250 nm to about 1 μm, about 250 nm to about 10 μm, about 300 nm to about 1 μm, or about 300 nm to about 10 μm, about 1 nm to about 10 μm, or about 1 nm to about 100 μm.

The third waveguide portion 308 may have a lower refractive index than a refractive index of the first waveguide portion 304, the second waveguide portion 306, and/or a combination of the first waveguide portion 304 and the second waveguide portion 306. The first waveguide portion 304 and the second waveguide portion 306 may comprise a first dielectric material (e.g., first high-index dielectric material), such as silicon or silicon nitride. The third waveguide portion 308 may comprise a second dielectric material (e.g., second low-index dielectric material), such as alumina. The second dielectric material may be a lower index dielectric material than the first dielectric material. The first waveguide portion 304 and the second waveguide portion 306 may be solid. The third waveguide portion 308 may be a liquid or a solid. Any combination of dielectric materials may be used for the third waveguide portion 308, second waveguide portion 306, or the third waveguide portion 308 (e.g., as long as third waveguide material has a lower dielectric index). Example materials include silicon, silicon nitride, graphene, gallium arsenide, indium phosphide, lithium niobate, and/or the like.

The structure 300 may comprise a modulation element configured to modify one or more of the refractive index or the effective refractive index to modulate the signal. The modulation element may comprise a heater, a voltage element, or a combination thereof. The structure may be part of a system, such as an optical communication system. The system may comprise an optical source. The signal (e.g., from the optical source) may be modulated to communicate data from one device and/or component to another. In some scenarios, the structure 300 may comprise an additional layer 310. The additional layer 310 may be disposed on one or more of the substrate 302, the first waveguide portion 304, the second waveguide portion 306, the third waveguide portion 308, or a combination thereof. The additional layer may comprise air, or any other material.

Figure 4:
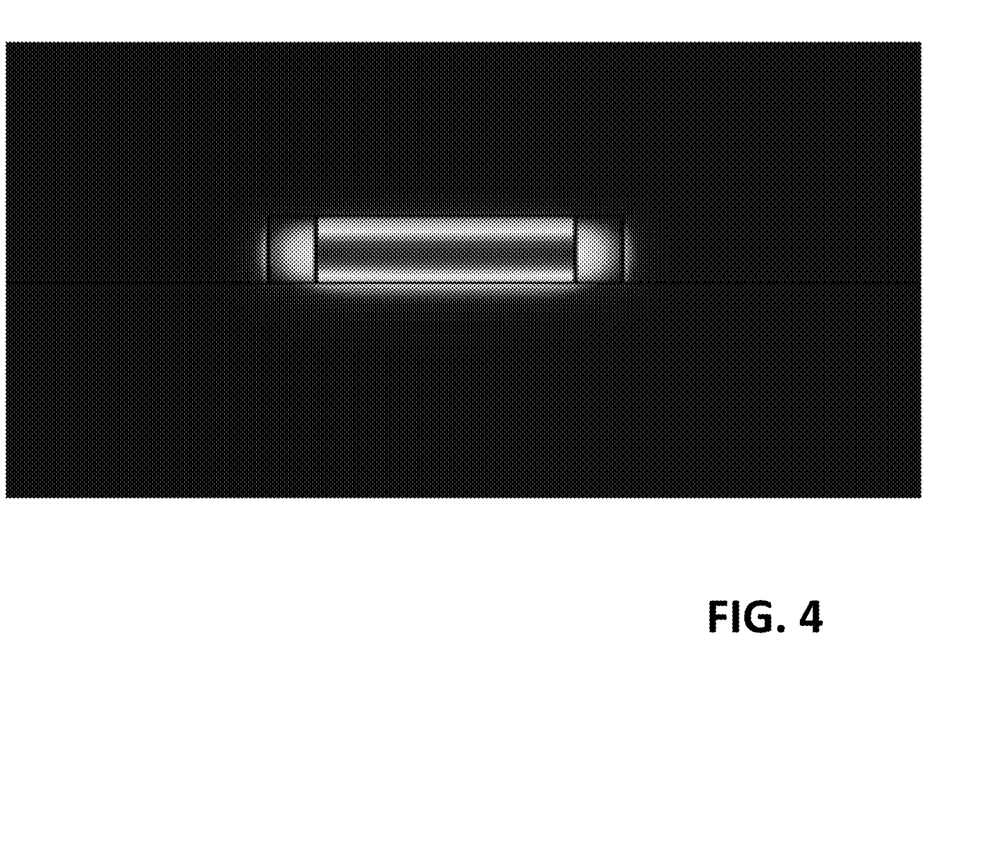
FIG. 4 provides an illustrative simulation of the two silicon nitride waveguides separated by a gap filled with alumina, both over silicon oxide substrate covered by air.

As shown in FIGS. 3A-B, a new material layer may be introduced (e.g., as compared to the waveguide 102 of FIG. 1) at the position of maximum electric field amplitude (e.g., the center, in this case), which generates a new waveguide geometry. This new waveguide configuration may be formed by two silicon nitride waveguides (e.g., each one with a width of 375 nm and a thickness of 730 nm), separated by a gap (with a width of 1 μm and a thickness of 730 nm) filled with alumina, both over silicon oxide substrate covered by air (e.g., uncladded), as illustrated in FIG. 3A. The refractive index of the new material used (e.g., alumina, in this case), is larger than the effective refractive index of the optical mode presented in FIG. 2. The final result is presented in FIG. 4, where the electric field spatial distribution of the new structure (e.g., the structure 300 of FIGS. 3A-B) has the highest field amplitude located at the low-refractive-index material. The distance between the two waveguides used in FIGS. 3A-B is merely illustrative since the field remains constant at any distance, it does not depend on the new layer width (or the gap size).

In the same way that a material with a given refractive index can be used to match the effective refractive index of a given optical mode in a given waveguide structure, the opposite is also possible. The waveguide structure can be designed to have an optical mode with an effective refractive index that matches the refractive index of the desired material. The complementary method can be used to concentrate light inside fluid media placed between solids waveguides, for example.

The method and structure described here can be generalized for multilayers and higher-order optical modes. For example, high-order modes have multiple position points where the electric field amplitude is maximum; therefore, the matching layer can be included in other positions that are not the geometric center, or multiple matching layers can be included, creating the same effect in different places of the structures.

The disclosed techniques provide improvements over conventional approaches. The slot-waveguide, which relies on the discontinuities of the normal component of the electric field at the dielectric interfaces, is also used to achieve light confinement inside low-refractive-index materials. However, the slot-waveguide effect only works for very small gaps between the two high-refractive-index materials (below 200 nm in the telecom wavelength range), for a specific optical mode and polarization (e.g., the fundamental quasi-TE in a vertical-oriented slot or the fundamental quasi-TM in a horizontal-oriented slot). In contrast, the disclosed method and structure works for any optical mode (e.g., including high-order modes), polarization, and it is independent of the size of the gap.

In the case of the plasmonic waveguides, the metal ohmic losses restrict the light propagation length. The metal losses also limit their applications and design freedom to a very specific wavelength (dictated by the imaginary part of the metal refractive index), and only to a specific TM polarization (a fundamental limitation imposed by the boundary conditions). On the other hand, the pure dielectric structures disclosed here are fundamentally lossless, as the same structure and method can be generalized to any wavelength of the electromagnetic spectrum, at different polarizations, and to multiple layers.

As examples of applications, the method and devices proposed can be used to confine most of the light inside low-refractive-index material, which can enhance the optical sensor sensitivity and the light-matter interaction with non-linear optical materials. It may also be employed in dispersion engineering in optical devices because it allows one to obtain a specific group index inside of the matching layer. Besides that, if the refractive index of the gap material can be externally modulated (by using thermal or electric-optical effects, for example), then the described methods and structures can be applied to improve optical modulators and switches by controlling the field distribution and its overlap (interaction) with the active material.

Other kinds of applications are based on the engineering of the field distribution, not necessarily constant. As discussed, the angle (the slope) at which the electric field is spatially distributed inside of the material layer can be controlled by the appropriate choice of the position where the layer is placed. Such control can be used to enhance or to reduce the light-matter interaction in a given material. The proposed method can be used to enhance near-field based devices as, for instance, gradient forces or radiation pressure optical devices since these forces depend on the gradient of the fields. Also in directional couplers, where the coupling strength depends on the amount of overlap of the evanescent field of one waveguide with the next waveguide. The improvement of the overlap can significantly reduce the device length—coupling length is the length needed to transfer 100% of the power between the two waveguides.

Further Examples

Waveguiding at the critical angle in a dielectric multi-layered structure according to the techniques of the present disclosure was experimentally demonstrated as explained in detail below. At this critical angle, the waveguide becomes scale invariant and the field is confined to the low-index region, with a spatially-uniform transverse profile.

Recently, non-Hermitian physics in photonic devices have attracted a lot of attention. The possibility of undergoing phase transitions at the exceptional points has created extra degrees of freedom, where the imaginary part of the dielectric permittivity, associated with optical loss or gain, has expended the photonic domain to the complex plane.

Here, novel lossless dielectric waveguide based on the interplay between real (guided) and imaginary (radiation) modes in dielectric waveguides is demonstrated. The example waveguide showed unusual properties, such as the guiding in the low index medium (e.g., which, in contrast to the sub-wavelength slot waveguide, can be several wavelengths in dimension and works for both TE/TM polarizations). The guiding mechanism is associated with non-Hermitian physics, without creating propagation losses or making use of gain materials. To illustrate the disclosed techniques, a dielectric slab waveguide (e.g., five-layers) composed of two high-refractive-index materials ($n_H$) is shown in FIGS. 5A-D. Each of the high-refractive-index materials had a thickness $t_H$. The high-refractive-index materials were separated by a low-refractive-index material ($n_S$) of thickness $t_S$. The layers were immersed in a semi-infinite low-refractive-index material ($n_C$), where it is assumed that $n_H > n_S > n_C$ and the guides modes are inside the interval $n_S < n_{\mathit{eff}} < n_H$, where $n_{\mathit{eff}}$ is the mode effective index.

Figure 5A:
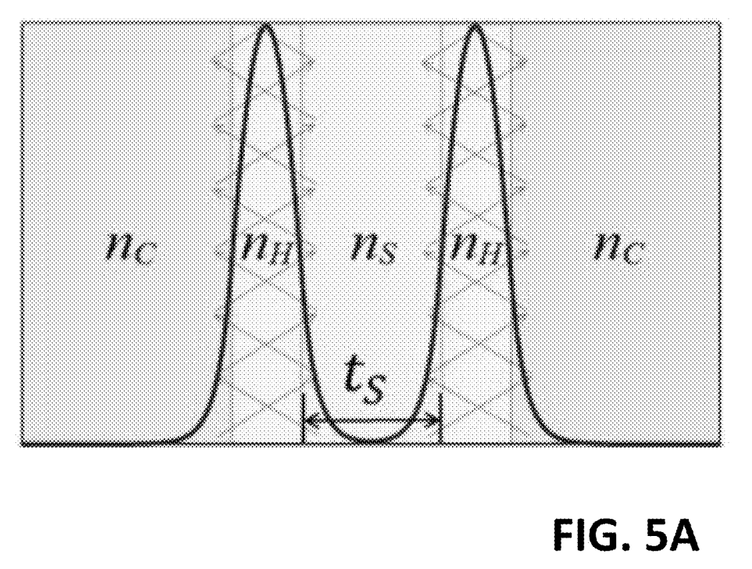
FIG. 5A shows that for $n_S = n_C$, the angle of incidence is above the critical angle at the inner interfaces creating the evanescent waves between the two waveguides with exponential fields decay.
Figure 5B:
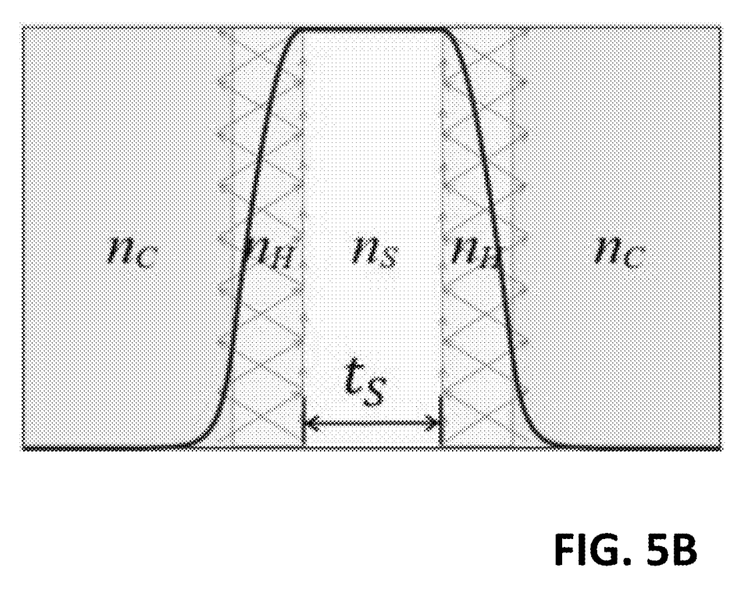
FIG. 5B shows that at $n_S = n_{EP}$, the angle of incidence is equal to the critical angle, and the refractive waves travel at the interfaces.
Figure 5C:
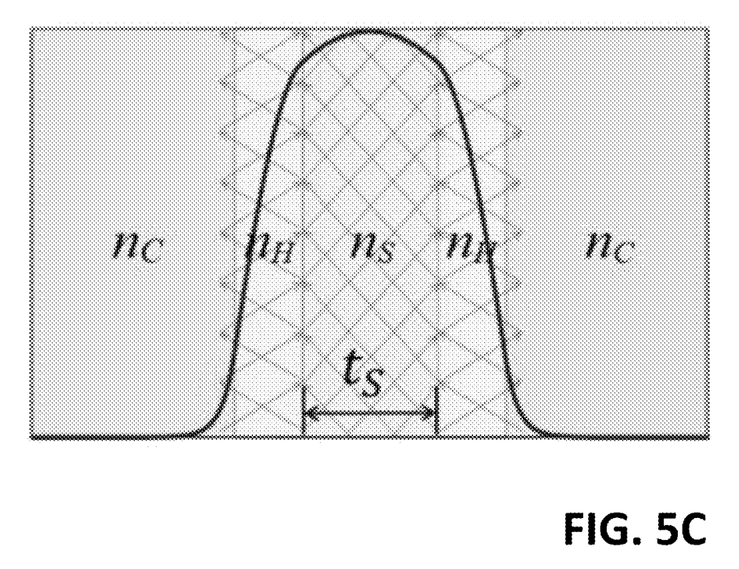
FIG. 5C shows that when $n_S > n_{EP}$, the angle of incidence below the critical angle, there are reflection and refraction on both sides of the interfaces trapping the waves through solely the outer interfaces.
Figure 5D:
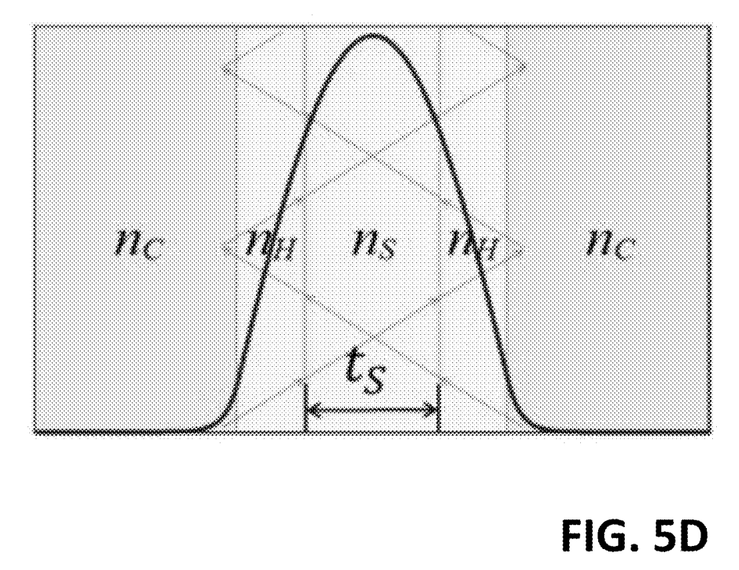
FIG. 5D shows that for $n_S = n_H$, it recovers the single wider waveguide.
Figure 5E:
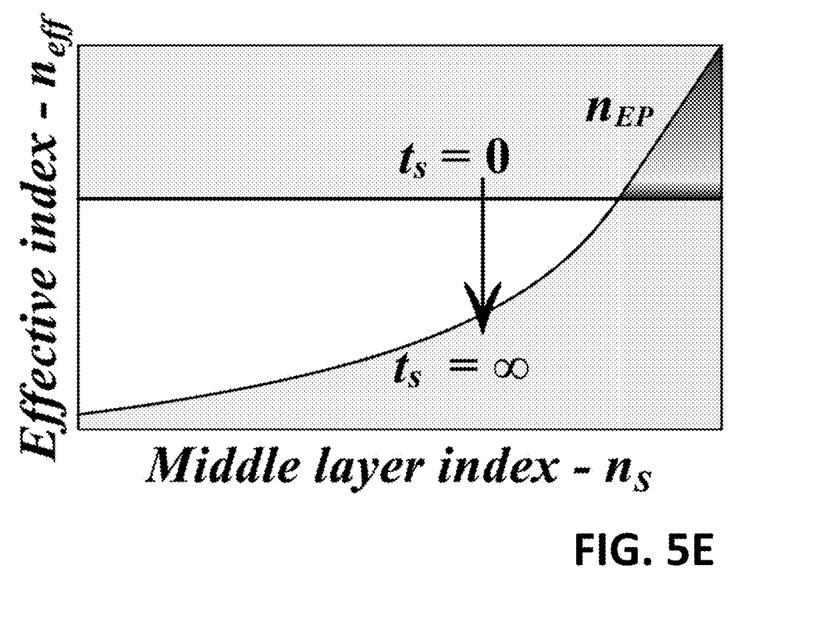
FIG. 5E shows effective index as a function of the middle layer index for different thickness $t_S$ showing the degeneracy (i.e. scale invariance) at the exceptional point.
Figure 5F:
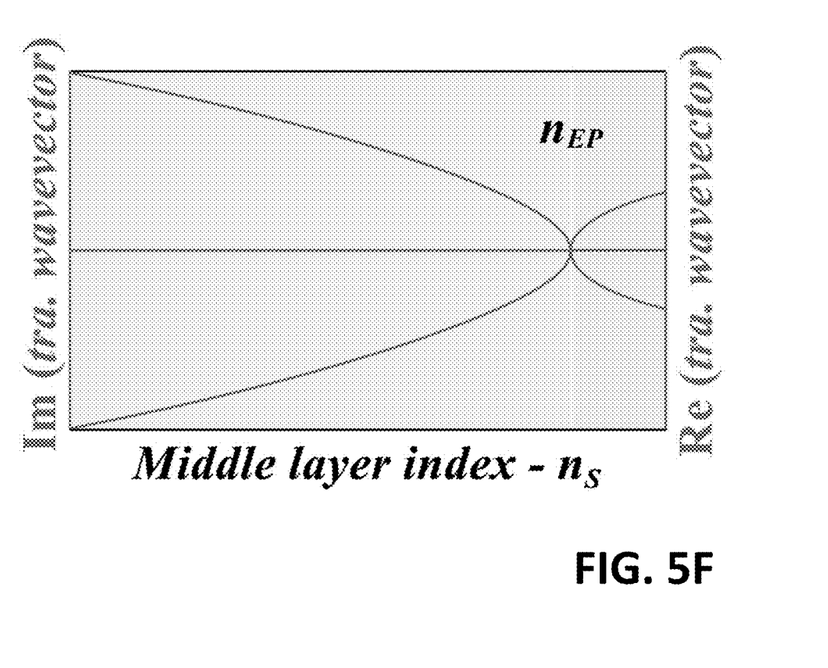
FIG. 5F shows a bifurcation diagram showing the phase transition of the transversal wavevector at the exceptional point.

FIGS. 5A-D show ray-optics pictures and electromagnetic spatial distribution of the electric field intensities ($|E|^2$), for fundamental TE mode. For $n_S = n_C$, the optical mode has an (evanescent) exponential decay inside the middle layer, as shown in FIG. 5A. By increasing $n_S$ above $n_C$, the evanescent field starts to increase until it reaches an exceptional point $n_S = n_{EP}$, where the electric field is perfectly uniform inside the middle layer, as presented in FIG. 5B. The exceptional point coincides with the effective index of the mode when the thickness of the middle layer is zero ($t_S = 0$); therefore, at this point, the system losses dimensionality, and the optical mode presents translational invariance. This behavior is represented by a constant effective index ($n_{\mathit{eff}}$), as illustrated in FIG. 5E. FIG. 5F shows the bifurcation diagram formed by the transverse wavevector as a function of the middle layer index, where the exceptional point is at the transition between the real and the imaginary part. Furthermore, when $n_S > n_{EP}$, the mode becomes an internal radiation mode, where most of the light is confined in the lower index material, as presented in FIG. 5C. When $n_S = n_H$, the waveguide is now a thicker single waveguide, as shown in FIG. 5D.

FIG. 5A shows that for $n_S = n_C$, the angle of incidence is above the critical angle at the inner interfaces creating the evanescent waves between the two waveguides with exponential fields decay. FIG. 5B shows that at $n_S = n_{EP}$, the angle of incidence is equal to the critical angle, and the refractive waves travel at the interfaces. FIG. 5C show that when $n_S > n_{EP}$, the angle of incidence below the critical angle, there are reflection and refraction on both sides of the interfaces trapping the waves through solely the outer interfaces. FIG. 5D show that for $n_S = n_H$, it recovers the single wider waveguide. FIG. 5E shows effective index as a function of the middle layer index for different thickness $t_S$ showing the degeneracy (i.e. scale invariance) at the exceptional point. FIG. 5F shows a bifurcation diagram showing the phase transition of the transversal wavevector at the exceptional point.

By applying ray-optical concepts, we show that the exceptional point corresponds exactly to the critical angle between the two waveguides and middle layer; thus allowing for the refracted waves to propagate at the interface between two media. The result is consistent with our previous electromagnetic analysis shown in FIG. 5B where the decay length of the field diverges to infinity. Furthermore, after the exceptional point the angle of incidence is below the critical angle, avoiding the total internal reflection; therefore, the refracted waves are trapped between the two outer interfaces of the waveguide, as shown in FIG. 5C.

Figure 6A:
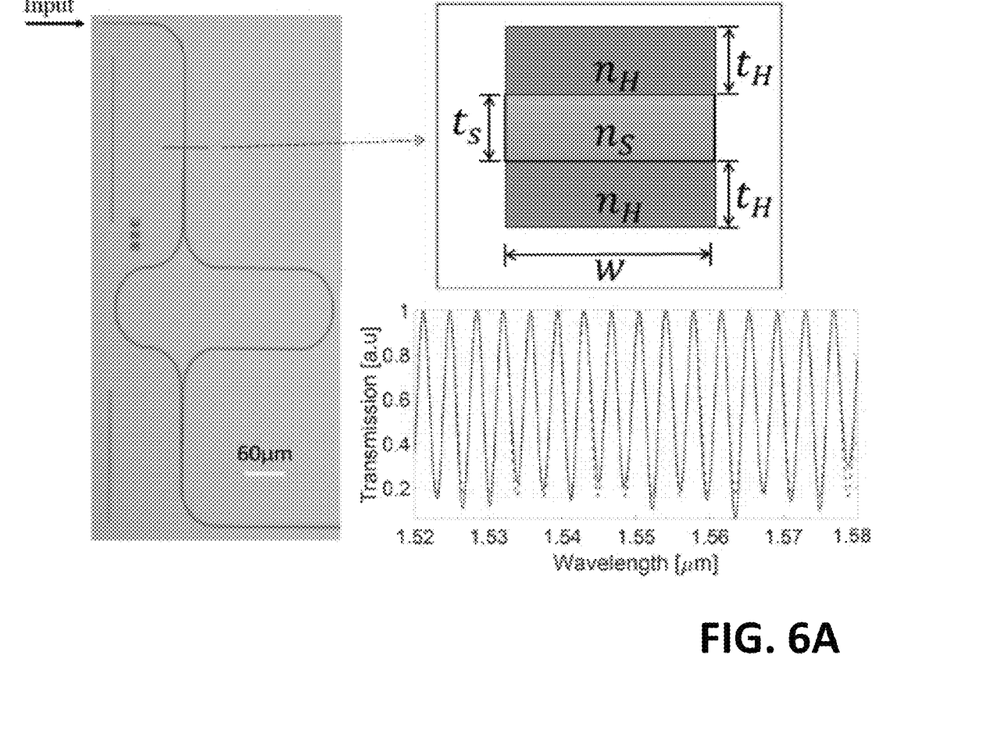
FIG. 6A shows waveguide geometry with two high-index materials with index $n_H$ and thickness $t_H$ are separated by a low-index material with refractive index $n_S$ and thickness $t_S$.
Figure 6B:
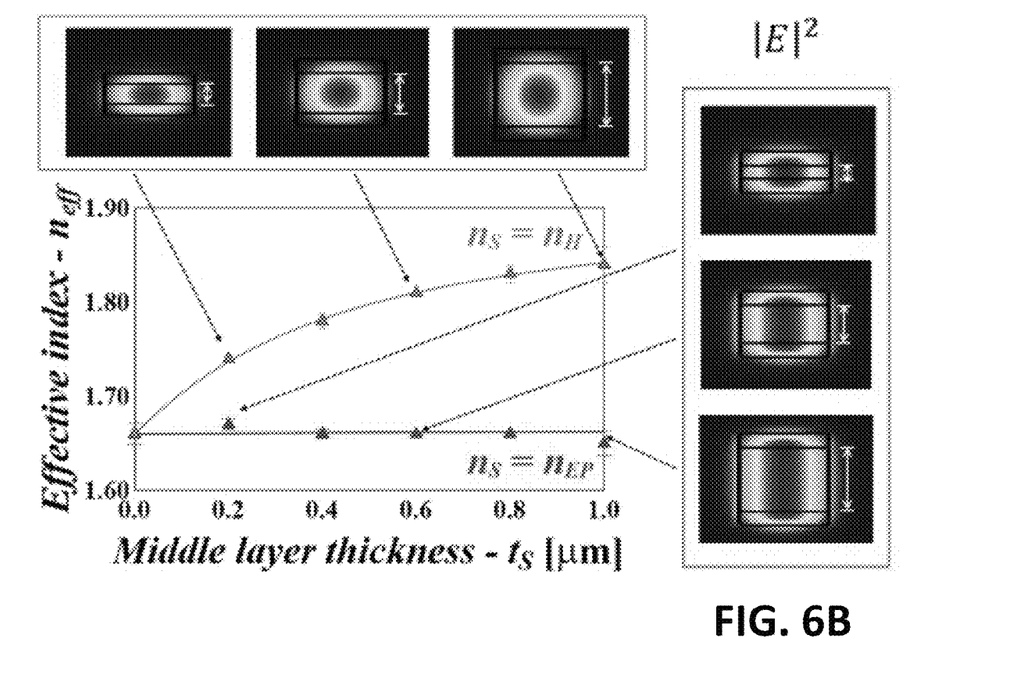
FIG. 6B shows experimental (triangles) and simulation (solid lines) of the effective index $n_{eff}$ as a function of the middle layer thickness for the two situations discussed previously.

FIG. 6A shows waveguide geometry: two high-index materials with index $n_H$ and thickness $t_H$ are separated by a low-index material with refractive index $n_S$ and thickness $t_S$. Optical microscope image showing one of the MZI used to measure the effective index and one example of the measured spectra showing the experimental transmission and fitting curve. FIG. 6B shows experimental (triangles) and simulation (solid lines) of the effective index $n_{eff}$ as a function of the middle layer thickness for the two situations discussed previously. FDTD simulation of intensity spatial distribution as a function of middle layer thicknesses $t_S$ for each case.

To demonstrate the proposed effect, fabricate a vertical stack composed of two silicon nitride SIN layers ($n_H \cong 2.0$) separated by a silicon oxynitride layer ($n_S \cong 1.75$) was fa, as shown in the inset of FIG. 6A. The width of the waveguide w is chosen to be 1 μm, while the thickness of the silicon nitride layer, $t_H = 220$ nm, is designed to have the predicted behavior near the telecom wavelength ($\lambda_0 = 1.55$ μm) for the TE fundamental mode. We also fabricated pure SIN waveguides ($n_S = n_H$), to contrast with the proposed device. A microscope image of one of the MZI interferometer devices is presented in FIG. 6A, as well as one of the measured spectra with its fitting curve by using the Least Square regression method. FIG. 6B shows the effective index behavior for five different values of the middle layer thickness, measured at the wavelength of 1.545 μm. The results show that, in contrast to the conventional waveguide, the effective index of the novel waveguide stays practically constant. The FDTD simulations show the invariance of the electromagnetic intensity profile, in contrast with the usual Gaussian-like profile observed in conventional waveguides. For larger wavelengths, or thinner silicon nitride layers, most of the light will be confined in the low index material presenting a new way of confining light to the low-index material.

The present disclosure may be directed to at least the following aspects:

Aspect 1. A device comprising: a first waveguide portion disposed on a substrate; a second waveguide portion; and a third waveguide portion disposed between the first waveguide portion and the second waveguide portion, wherein the third waveguide portion is configured to carry a signal based on a refractive index of the third waveguide portion matching an effective refractive index of an optical mode of a combination of the first waveguide portion and the second waveguide portion.

Aspect 2. The device of Aspect 1, wherein the third waveguide portion has a lower refractive index than a refractive index of one or more of the combination of the first waveguide portion and the second waveguide portion, the first waveguide portion, or the second waveguide portion.

Aspect 3. The device of any one of Aspects 1-2, wherein the second waveguide portion and the third waveguide portion are formed on the substrate.

Aspect 4. The device of any one of Aspects 1-3, further comprising a modulation element configured to modify one or more of the refractive index or the effective refractive index to modulate the signal, wherein the modulation element comprises one or more of a heater or a voltage element.

Aspect 5. The device of any one of Aspects 1-4, wherein the third waveguide portion separates the first waveguide portion and the second waveguide portion by a distance in a range of one or more of about 200 nm to about 1 μm, about 200 nm to about 10 μm, about 250 nm to about 1 μm, about 250 nm to about 10 μm, about 300 nm to about 1 μm, about 300 nm to about 10 μm, about 1 nm to about 10 μm, or about 1 nm to about 100 μm.

Aspect 6. The device of any one of Aspects 1-5, wherein the first waveguide portion and the second waveguide portion comprise one or more of a dielectric material, a high-index dielectric material, silicon, or silicon nitride, and wherein the third waveguide portion comprises one or more of a dielectric material, a low-index dielectric material, silicon oxynitride, or alumina. A high-index dielectric material may comprise a material with a dielectric index of 2 or higher. A low-index dielectric material may comprise a material with a dielectric index of lower than 2.

Aspect 7. The device of any one of Aspects 1-6, wherein the refractive index matching the effective refractive index comprises the refractive index matching, within a threshold range, the effective refractive index.

Aspect 8. The device of any one of Aspects 1-7, wherein the first waveguide portion and the second waveguide portion are solid and the third waveguide portion is a liquid or solid Aspect 9. The device of any one of Aspects 1-8, wherein the signal comprises an optical signal.

Aspect 10. The device of any one of Aspects 1-9, wherein the effective refractive index of the optical mode is based on one or more of: a geometry of the combination of the first waveguide portion and the second waveguide portion, a wavelength associated with optical mode, or a material (e.g., dielectric material) of the combination of the first waveguide portion and the second waveguide portion.

Aspect 11. A method comprising: forming a first waveguide portion on a substrate; forming a second waveguide portion; and forming a third waveguide portion between the first waveguide portion and the second waveguide portion, wherein the third waveguide portion is configured to carry a signal based on a refractive index of the third waveguide portion matching an effective refractive index of an optical mode of a combination of the first waveguide portion and the second waveguide portion.

Aspect 12. The method of Aspect 11, further comprising determining a material for forming the third waveguide portion based on the material having the refractive index matching the effective refractive index.

Aspect 13. The method of any one of Aspects 11-12, wherein the third waveguide portion has a lower refractive index than a refractive index of one or more of the combination of the first waveguide portion and the second waveguide portion, the first waveguide portion, or the second waveguide portion.

Aspect 14. The method of any one of Aspects 11-13, wherein the second waveguide portion and the third waveguide portion are formed on the substrate.

Aspect 15. The method of any one of Aspects 11-14, further comprising modifying the signal by modifying, using one or more of heat or voltage, one or more of the refractive index or the effective refractive index.

Aspect 16. The method of any one of Aspects 11-15, wherein the third waveguide portion separates the first waveguide portion and the second waveguide portion by a distance in a range of one or more of about 200 nm to about 1 μm, about 200 nm to about 10 μm, about 250 nm to about 1 μm, about 250 nm to about 10 μm, about 300 nm to about 1 μm, about 300 nm to about 10 μm, about 1 nm to about 10 μm, or about 1 nm to about 100 μm.

Aspect 17. The method of any one of Aspects 11-16, wherein the first waveguide portion and the second waveguide portion comprise one or more of a dielectric material, a high-index dielectric material, silicon, or silicon nitride, and wherein the third waveguide portion comprises one or more of a dielectric material, a low-index dielectric material, silicon oxynitride, or alumina. A high-index dielectric material may comprise a material with a dielectric index of 2 or higher. A low-index dielectric material may comprise a material with a dielectric index of lower than 2.

Aspect 18. The method of any one of Aspects 11-17, wherein the refractive index matching the effective refractive index comprises the refractive index matching, within a threshold range, the effective refractive index.

Aspect 19. The method of any one of Aspects 11-18, wherein the first waveguide portion and the second waveguide portion are solid and the third waveguide portion is a liquid or solid.

Aspect 20. The method of any one of Aspects 11-19, wherein the signal comprises an optical signal.

Aspect 21. The method of any one of Aspects 11-20, wherein the effective refractive index of the optical mode is based on one or more of: a geometry of the combination of the first waveguide portion and the second waveguide portion, a wavelength associated with optical mode, or a material (e.g., dielectric material) of the combination of the first waveguide portion and the second waveguide portion.

Aspect 22. The method of any one of Aspects 11-21, wherein the third waveguide portion is disposed above the first waveguide portion, and the second waveguide portion is disposed above the third waveguide portion.

Aspect 23. The device of any one of Aspects 1-10, wherein the third waveguide portion is disposed above the first waveguide portion, and the second waveguide portion is disposed above the third waveguide portion.

Aspect 24. The device of any one of Aspects 1-10 or 23, wherein the third waveguide portion is one or more of atomically thin, two-dimensional, or has a single layer of atoms.

Aspect 25. The method of any one of Aspects 11-22, wherein the third waveguide portion is one or more of atomically thin, two-dimensional, or has a single layer of atoms.

What is claimed:

1. A device comprising:
   a first waveguide portion disposed on a substrate;
   a second waveguide portion; and
   a third waveguide portion disposed between the first waveguide portion and the second waveguide portion, wherein the third waveguide portion is configured to carry a signal based on a refractive index of the third waveguide portion matching an effective refractive index of an optical mode of a combination of the first waveguide portion and the second waveguide portion.

2. The device of claim 1, wherein the third waveguide portion has a lower refractive index than a refractive index of the combination of the first waveguide portion and the second waveguide portion.

3. The device of claim 1, wherein the second waveguide portion and the third waveguide portion are formed on the substrate.

4. The device of claim 1, wherein the third waveguide portion is disposed above the first waveguide portion, and the second waveguide portion is disposed above the third waveguide portion.

5. The device of claim 1, further comprising a modulation element configured to modify one or more of the refractive index or the effective refractive index to modulate the signal, wherein the modulation element comprises one or more of a heater or a voltage element.

6. The device of claim 1, wherein the third waveguide portion separates the first waveguide portion and the second waveguide portion by a distance in a range of one or more of about 200 nm to about 1 μm, about 200 nm to about 10 μm, about 250 nm to about 1 μm, about 250 nm to about 10 μm, about 300 nm to about 1 μm, about 300 nm to about 10 μm, about 1 nm to about 10 μm, or about 1 nm to about 100 μm.

7. The device of claim 1, wherein the first waveguide portion and the second waveguide portion comprise one or more of a first dielectric material, silicon, or silicon nitride, and wherein the third waveguide portion comprises one or more of a second dielectric material, silicon oxynitride, or alumina.

8. The device of claim 1, wherein the refractive index matching the effective refractive index comprises the refractive index matching, within a threshold range, the effective refractive index.

9. The device of claim 1, wherein the first waveguide portion and the second waveguide portion are solid and the third waveguide portion is a liquid.

10. The device of claim 1, wherein the effective refractive index of the optical mode is based on one or more of: a geometry of the combination of the first waveguide portion and the second waveguide portion, a wavelength associated with the optical mode, or a material of the combination of the first waveguide portion and the second waveguide portion.

11. The device of claim 1, wherein the optical mode of the combination of the first waveguide portion and the second waveguide portion comprises an optical mode of a resulting waveguide if the distance between the second waveguide portion and the first waveguide portion was reduced to zero.

12. A method comprising:
    forming a first waveguide portion on a substrate;
    forming a second waveguide portion; and
    forming a third waveguide portion between the first waveguide portion and the second waveguide portion, wherein the third waveguide portion is configured to carry a signal based on a refractive index of the third waveguide portion matching an effective refractive index of an optical mode of a combination of the first waveguide portion and the second waveguide portion.

13. The method of claim 12, further comprising determining a material for forming the third waveguide portion based on the material having the refractive index matching the effective refractive index.

14. The method of claim 12, wherein the third waveguide portion has a lower refractive index than a refractive index of the combination of the first waveguide portion and the second waveguide portion.

15. The method of claim 12, wherein the second waveguide portion and the third waveguide portion are formed on the substrate.

16. The method of claim 12, further comprising modifying the signal by modifying, using one or more of heat or voltage, one or more of the refractive index or the effective refractive index.

17. The method of claim 12, wherein the third waveguide portion separates the first waveguide portion and the second waveguide portion by a distance in a range of one or more of about 200 nm to about 1 μm, about 200 nm to about 10 μm, about 250 nm to about 1 μm, about 250 nm to about 10 μm, about 300 nm to about 1 μm, about 300 nm to about 10 μm, about 1 nm to about 10 μm, or about 1 nm to about 100 μm.

18. The method of claim 12, wherein the first waveguide portion and the second waveguide portion comprise one or more of a first dielectric material, silicon, or silicon nitride, and wherein the third waveguide portion comprises one or more of a second dielectric material, silicon oxynitride, or alumina.

19. The method of claim 12, wherein the refractive index matching the effective refractive index comprises the refractive index matching, within a threshold range, the effective refractive index.

20. The method of claim 12, wherein the first waveguide portion and the second waveguide portion are solid and the third waveguide portion is a liquid.

21. The method of claim 12, wherein the effective refractive index of the optical mode is based on one or more of: geometry of the combination of first waveguide portion and the second waveguide portion, a wavelength associated with the optical mode, or a material of the combination of the first waveguide portion and the second waveguide portion.

* * * * *